Nov. 8, 1955     T. L. SMITH     2,723,143
GASKET
Filed June 16, 1952
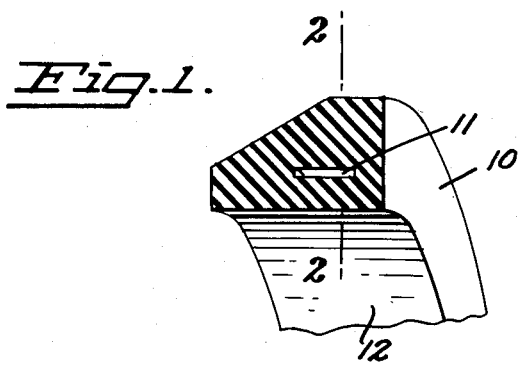
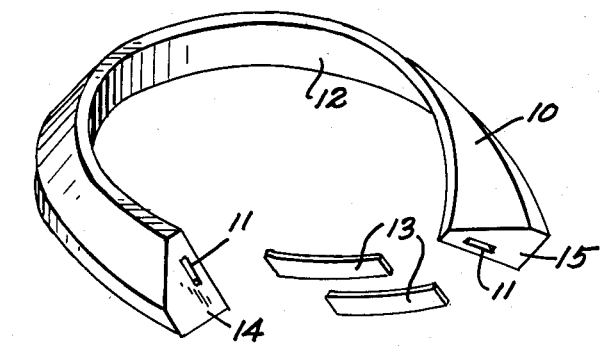
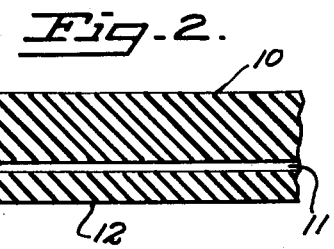
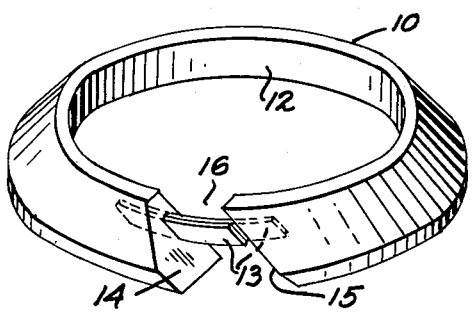
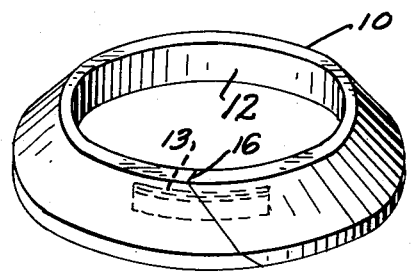
INVENTOR.
TELFORD L. SMITH
BY
ATTORNEY

United States Patent Office 2,723,143
Patented Nov. 8, 1955

2,723,143

GASKET

Telford L. Smith, South San Francisco, Calif.

Application June 16, 1952, Serial No. 293,811

7 Claims. (Cl. 288—35)

This invention relates to an improved annular gasket and to a method for joining the ends of a strip gasket together to form an annular gasket.

The gasket of this invention has many different uses, one of which is to provide a seal for a coupling used in repairing broken pipe. There are too many different sizes of pipes to make it practical to mold a gasket for each size; therefore, each gasket is usually made up by cutting off a strip of gasket stock from long hundred-yard coils and then forming these strips into rings, with the two ends of the strip meeting. In making gaskets of this type, it has been difficult to hold the two ends together in a way that will prevent the ring from twisting or turning and becoming deformed.

The present invention solves that problem by employing a novel type of gasket stock with a continuous non-round passageway through it. When a gasket strip has been cut from the stock roll, one or more short metal strips may be inserted in the passageway to bridge the split in the ring. These metal strips hold the gasket in its ring form without permitting the rubber gasket to twist or turn as would be the case if the passageway were round. In this way a perfect ring may be formed whether or not the ring is vulcanized.

Other objects and advantages of the invention will appear from the following description of one preferred embodiment thereof. However, it will be understood that changes in the shape of the gasket and the shape of the opening through it and in the type of the metal member used in coupling the gasket together may all be changed without departing from the spirit of the invention as defined in the appended claims.

In the drawings:

Fig. 1 is a view in elevation and in section of a piece of gasket stock used with the invention.

Fig. 2 is a view in side elevation and in section of the gasket stock, taken along the line 2—2 of Fig. 1.

Fig. 3 is an exploded view showing the parts used to assemble a section of gasket stock into a ring.

Fig. 4 is a view in perspective showing a ring partially assembled.

Fig. 5 is a view of the completely assembled ring.

The gasket stock 10 shown in the drawings has a particular cross-sectional shape, but the only reason for this is that some cross-sectional shape had to be shown. The gasket stock may have practically any desired shape: square, rectangular, triangular and any non-circular shape. The invention may, if desired, be used with round stock, but there is little reason to do so because there are fewer problems with that type of material, whereas with non-round stock there are serious problems which remained unsolved until the present invention solved them.

An important feature of the invention is the provision of a passageway 11 through the gasket stock. Since the gasket stock is normally made up by extruding the material in very long lengths, and since it is never known how long each strip will be or where the stock will be cut, this passageway 11 is preferably continuous throughout the length of the stock 10, even though it is actually used only adjacent to the two ends of the gasket.

The hole 11 shown in the drawings is in the form of a flat rectangle much wider in one direction than in the other. Other shapes may be used, and the rectangle or slit need not be parallel to the inner face 12 of the gasket 10 shown here, but this form is one very good shape with definite advantages and it illustrates the principle behind the invention. Obviously there may be more than one passageway 11 through the gasket 10.

In completing the ring, the only other necessary element is one or more metal strips 13. It is important to note that the passageway 11 and the strips 13 are not round nor almost round; because the strip 13 could then slip or turn in the passageway 11 and that would defeat the purpose of the invention, which is to secure exact alignment of the gasket by preventing this twisting and shearing action. Since metal strips are quite easily obtainable, the flat rectangular form of passageway 11 and strip 13 shown are normally used rather than a triangular or trapezoidal or oval or other shape which would require the manufacture of special metal strips. The strip 13 may be about the same size in cross section as the passageway 11, or it may be somewhat larger, so that it will be firmly held therein.

A single strip 13 may be used to link the gasket 10 together; however by using two strips 13, 13 a more satisfactory type of installation can often be obtained. The length of the strips 13 is relatively unimportant, so long as they are long enough to hold the ring together; by making them fairly short, material can be saved. If desired, the strips 13 may be bent into somewhat of a curve.

In practice one strip 13 may be put into each end 14, 15 of the gasket 10. It will be noted in Figs. 4 and 5 that the gasket ends 14, 15 are shown cut off at an angle. This is not necessary but it is normal practice. One strip 13 is inserted at one end 14 and the other strip 13 is inserted in the other end 15. The two ends are then put together, the strips 13, 13 being held parallel and touching. They are then forced so that both of them bridge the gap 16 between the ends 14, 15.

The friction between the two metal strips 13, 13 helps to prevent them from slipping and provides a very rigid lock for holding the ring in true round shape. After the ring 10 is forced together as in Fig. 5, it may be vulcanized so that the juncture disappears, or it may be left unvulcanized.

I claim:

1. A ring gasket, including in combination a strip of resilient gasket stock having a non-round completely enclosed hole extending longitudinally all the way therethrough, said strip being formed into the shape of a ring with its ends meeting; and at least one non-round metal member in said hole, conforming to the shape of said hole and extending across the break where the two ends abut.

2. A ring gasket, including in combination a section of rubber gasket stock having a flat completely enclosed passageway extending longitudinally therethrough, said section being formed into the shape of a ring with its ends meeting; and at least one flat metal strip bridging across between the ends of said gasket and extending into said passageway on both sides thereof, said strip being approximately the same size and shape in cross section as said passageway.

3. A method of making ring gaskets from resilient gasket stock having a non-round completely enclosed passageway extending therethrough, comprising the steps of cutting off the desired length of gasket stock, inserting a short metal strip partway in the passageway at each end of the section of gasket stock, and forming said section into a ring with the metal strips touching one another and extending across the ends so as to hold the gasket free from twisting action.

4. A method of making resilient ring gaskets, comprising the steps of forming resilient gasket stock having a flat completely enclosed passageway extending all the way therethrough, cutting off a section of said gasket stock of the desired length, inserting a short flat metal strip in the passageway at each end of said section, and forming said section into a ring with the metal strips touching one another and extending across the break into the opposite passageway so as to hold the gasket free from twisting action.

5. The method of claim 4 in which said gasket is then vulcanized across said break.

6. A ring gasket, including in combination a section of rubber gasket stock having a flat passageway enclosed on all sides by a continuous wall of rubber and extending longitudinally through the entire length of said section, said section being formed into the shape of a ring with its ends meeting, said flat passageway lying parallel to the axial faces of said ring; and two flat metal strips each approximately the normal size and shape in cross-section of said passageway bridging across the ends of said gasket and extending into said passageway on both sides thereof and into contact with each other, the connection resulting in extending the size of said passageway where said strips are, so as to insure a tight connection.

7. The gasket of claim 6 in which said meeting ends are vulcanized together.

References Cited in the file of this patent

UNITED STATES PATENTS

| | | |
|---|---|---|
| 279,585 | Nugent | June 19, 1883 |
| 475,053 | Cabana | May 17, 1892 |
| 623,982 | Chesterton | May 2, 1899 |
| 714,271 | Alderfer | Nov. 25, 1902 |
| 1,037,414 | Bauer | Sept. 3, 1912 |
| 1,320,567 | Nawn | Nov. 4, 1919 |
| 1,884,266 | Russell | Oct. 25, 1932 |
| 1,966,202 | Pfefferle | July 10, 1934 |
| 2,610,078 | Risley et al. | Sept. 9, 1952 |

FOREIGN PATENTS

| | | |
|---|---|---|
| 11,629 | Great Britain | of 1900 |
| 216,392 | Great Britain | May 29, 1924 |
| 812,501 | Germany | Sept. 3, 1951 |